United States Patent
Pellman et al.

(10) Patent No.: US 9,284,126 B2
(45) Date of Patent: Mar. 15, 2016

(54) AUTOMATIC SCRAPER CHAIN TENSIONING APPARATUS

(71) Applicant: Patz Corporation, Pound, WI (US)

(72) Inventors: David C. Pellman, Coleman, WI (US); David W. Kaus, Coleman, WI (US)

(73) Assignee: Patz Corporation, Pound, WI (US)

( * ) Notice: Subject to any disclaimer, the term of this patent is extended or adjusted under 35 U.S.C. 154(b) by 0 days.

(21) Appl. No.: 14/733,463

(22) Filed: Jun. 8, 2015

(65) Prior Publication Data

US 2015/0353289 A1 Dec. 10, 2015

Related U.S. Application Data

(60) Provisional application No. 62/010,090, filed on Jun. 10, 2014.

(51) Int. Cl.
*B65G 23/44* (2006.01)
*B65G 19/18* (2006.01)
*A01K 1/01* (2006.01)
*B65G 19/20* (2006.01)
*B65G 19/04* (2006.01)
*B65G 19/08* (2006.01)

(52) U.S. Cl.
CPC .............. *B65G 23/44* (2013.01); *A01K 1/0128* (2013.01); *B65G 19/04* (2013.01); *B65G 19/08* (2013.01); *B65G 19/20* (2013.01)

(58) Field of Classification Search
CPC ........ B65G 19/04; B65G 19/06; B65G 19/08; B65G 19/10; B65G 19/12; B65G 23/44; A01K 1/0128

USPC .......................................................... 198/814
See application file for complete search history.

(56) References Cited

U.S. PATENT DOCUMENTS

| | | | | |
|---|---|---|---|---|
| 2,847,115 A * | 8/1958 | Ferris | .................... | A01K 1/0128 198/498 |
| 2,992,724 A * | 7/1961 | Berger | .................. | A01K 1/0128 198/493 |
| 3,229,664 A * | 1/1966 | Cymara | ................ | A01K 1/0128 119/451 |
| 3,960,110 A * | 6/1976 | Laurenz | ............... | A01K 1/0132 119/451 |
| 4,243,137 A * | 1/1981 | Laurenz | ................. | B65G 25/08 198/748 |
| 8,899,408 B2 * | 12/2014 | Polyak | .......................... | 198/814 |
| 8,936,147 B2 * | 1/2015 | Knas | ...................... | B65G 23/10 198/814 |

* cited by examiner

*Primary Examiner* — Mark A Deuble
(74) *Attorney, Agent, or Firm* — Nicholas A. Kees; Godfrey & Kahn, S.C.

(57) ABSTRACT

A chain tensioning apparatus for tensioning a chain of an agricultural barn cleaner. The barn cleaner chain is moved by a motor-driven drive sprocket mounted in a drive tower after contacting a first idler rotatably mounted to the drive tower. A second idler is mounted to the frame and positioned further away from the drive tower than the first idler such that, as the chain moves toward the drive tower, the chain contacts the second idler before contacting the first idler. A chain tensioning idler contacts the chain between the first idler and the second idler and is capable of movement in a direction transverse to the movement of the chain. A biasing member biases the chain tensioning idler toward a take-up position and away from a chain-taut position.

20 Claims, 8 Drawing Sheets

AUTOMATIC SCRAPER CHAIN TENSIONING APPARATUS

CROSS REFERENCE TO RELATED APPLICATION

This application claims the benefit of U.S. Provisional Patent Application Ser. No. 62/010,090, filed Jun. 10, 2014, and all information disclosed in that application is hereby incorporated herein by reference.

FIELD OF THE INVENTION

This invention relates to agricultural barn cleaners, and in particular to chain tensioning systems for extending the life of the chain and reducing maintenance needed on the system.

BACKGROUND OF THE INVENTION

Figure 1:
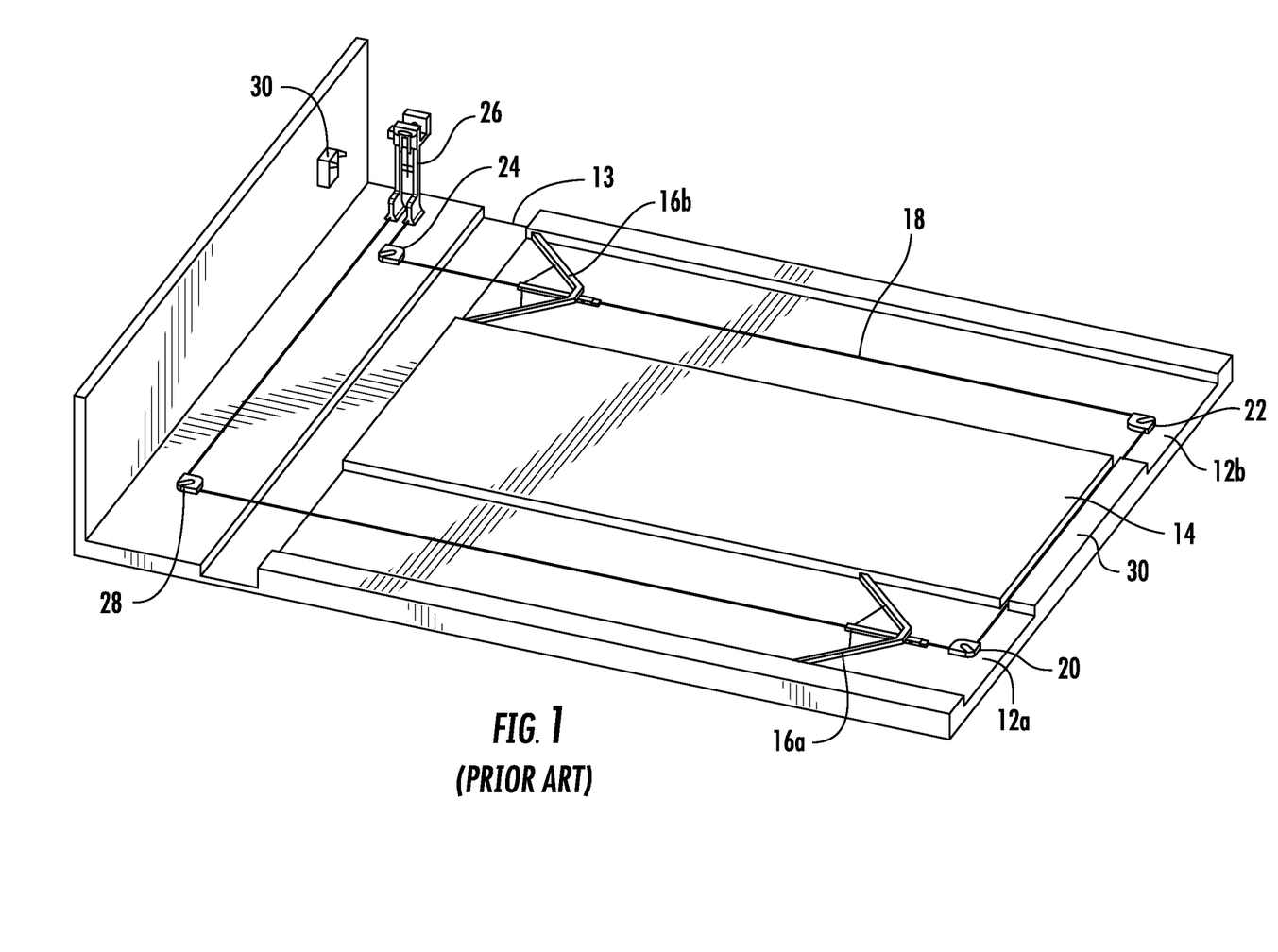
FIG. 1 is an isometric, somewhat schematic, view of a layout of a conventional barn, with conventional barn cleaning equipment.

Shown in FIG. 1 is a somewhat schematic layout of a conventional barn floor 10 having two primary gutters 12a and 12b that run most of the length of the floor, but only a small portion of the width of the floor, draining into a secondary gutter 13. The gutters 12a and 12b are separated by a raised center floor portion 14. Generally, livestock will be positioned on the raised center floor portion 14 in two rows, facing each other, with the primary gutters 12a and 12b positioned along the rear of the animals so as to collect the manure and other waste materials from the animals. According to conventional methods for cleaning the gutters, respective scrapers 16a and 16b are positioned in gutters 12a and 12b. The two scrapers 16a and 16b are connected to a single endless chain 18. Beginning with the first scraper 16a, the path of the chain 18 leads lengthwise within the gutter 12a to a first distal wheel 20, at the distal end of the gutter 12a, then proceeds across to a second distal wheel 22 in the opposite gutter 12b, then lengthwise within the gutter 12b to the second scraper 16b, then continuing lengthwise to a first proximal wheel 24 at the proximal end of the barn floor 10, then through a drive tower 26 (to be explained in more detail below), then to a second proximal wheel 28 in line with the first gutter 12a, where the chain continues within the gutter 12a and connects with the first scraper 16a. The drive tower 26 drives the chain 18 so as to move the scrapers 16a and 16b within the gutters 12a and 12b. The scrapers 16a and 16b are collapsible so that they collapse when moving away from the secondary gutter 13, and expand when moving toward the secondary gutter, so as to move any manure in the primary gutters into the secondary gutter, for final disposal or removal from the barn. Drive tower 26 may be controlled by a controller located nearby, such as control box 30 on a nearby wall in the barn.

Figure 2:
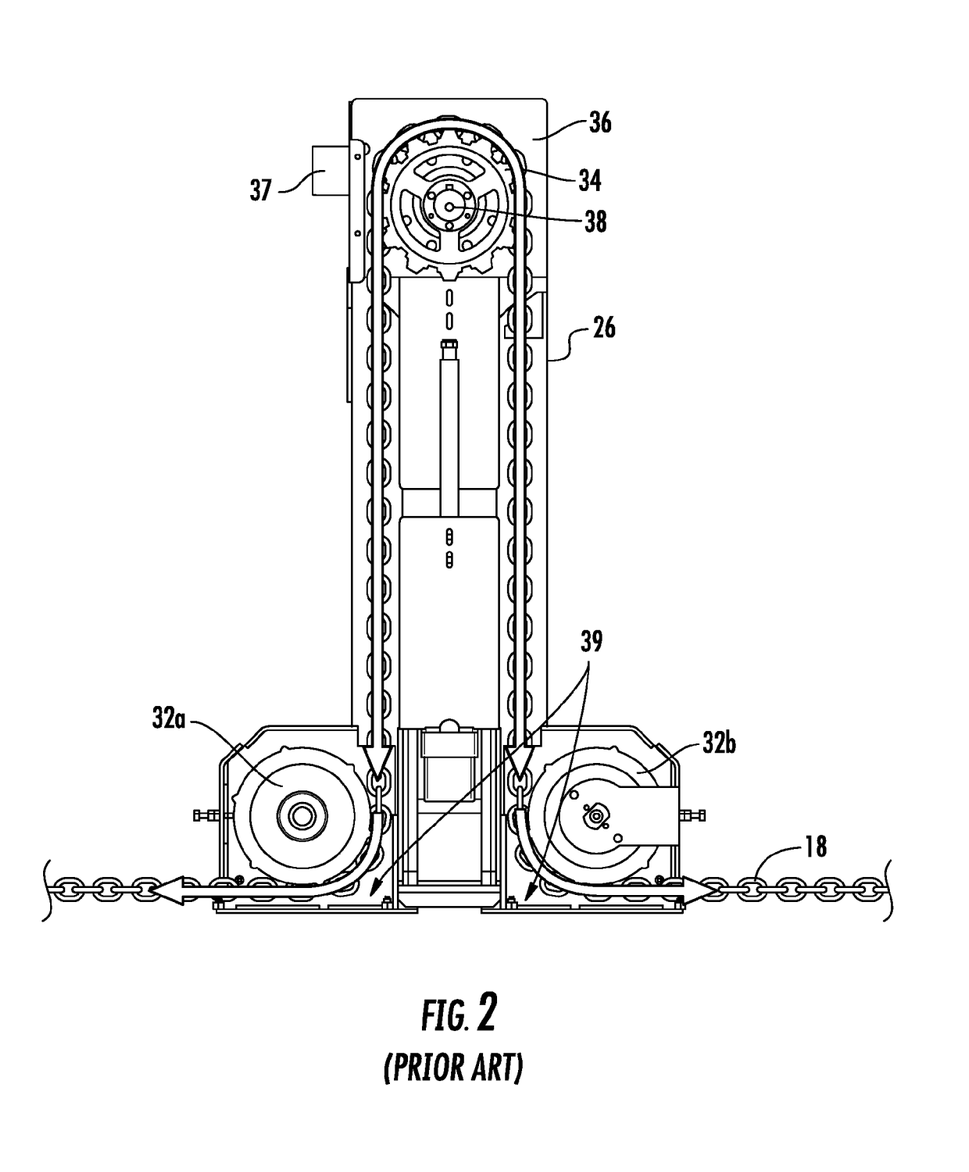
FIG. 2 is a front elevational view of a conventional drive tower, with the front guards removed to show the sprockets and chain inside.

FIG. 2 is an enlarged elevational view of drive tower 26. As can be seen there, a conventional drive tower 26 may have a pair of feed wheels 32a and 32b journaled thereto, one at each side of the tower, each of which admits the chain from its respective side. As the chain 18 enters the tower from one side, the chain moves up the tower 26 and passes over a pocket sprocket or drive sprocket 34. The drive sprocket 34 is driven by a gearbox 36, connected to the drive sprocket by a rotor shaft 38. Gearbox 36 is in turn driven by a motor 37 by way of a pulley and belt system, reducer, or other suitable transmission system.

While this arrangement works well in smaller barns, where the total chain length is 1000 feet or less, problems arise when the chain length exceeds 1000 feet, and in some barns, the desired chain length can extend up to 5000 feet or more. In such long chain situations, even though the chain is tensioned at installation by various adjustments made to the drive tower 26, the chain can have slack in it, to an extent even more than the chain tensioning built into the drive tower can absorb, based on various factors, including general chain wear, the possibility of chain stretching due the forces at work, and general chain slack that cannot be completely eliminated with the primary chain tensioning provided by the drive tower. That excess chain can build up in the area 39 near the feed wheels 32a, 32b. Primary chain tension is generally applied at the drive tower, but the effect of that preload on the chain 18 generally increases the load on the chain and hence the stresses within the chain, in turn causing increased wear. The preloaded tension at the drive tower has to be so great, to avoid the chance of jamming in long chain systems, that the chain is very tight even without moving under load. Without that high level of tension, depending on the direction of rotation of the drive sprocket, the feed wheel 32a, 32b towards which the drive sprocket is rotating can experience jamming. The chain 18 builds up at the bottom of drive tower 26, again in areas 39, due to lack of chain movement.

This invention relates to improvements over the structures described above, and to solutions to problems raised or not solved thereby.

SUMMARY OF THE INVENTION

The invention provides a chain tensioning apparatus for tensioning a chain of an agricultural barn cleaner. The barn cleaner includes at least one gutter scraper connected to a chain. The chain is moved by a motor-driven drive sprocket mounted in a drive tower after contacting a first idler rotatably mounted to the drive tower. The chain tensioning apparatus includes a frame, and at least one second idler mounted to the frame and positioned further away from the drive tower than the first idler such that, as the chain moves toward the drive tower, the chain contacts the second idler before contacting the first idler. A chain tensioning idler contacts the chain between the first idler and the second idler and is capable of movement in a direction transverse to the movement of the chain. A biasing member biases the chain tensioning idler toward a take-up position where the chain between the first and second idlers is relatively greater, and away from a chain-taut position where the length of chain between the first and second idlers is relatively less.

The objects of the invention include providing longer circuit lengths, which will have the effect of making this structure in general more applicable in more installations; less stress and/or wear on the drag chain, which will result in longer life for the drag chain; less power required to operate the equipment in a more energy efficient manner; and fewer drag chain jamming issues, resulting in fewer breakdowns and service calls. In addition, this invention will lessen the need for operator maintenance, because the chain will not have to be tightened as often, saving the operator time and money. These goals are important to the end user.

Other objects and advantages of the invention will become apparent hereinafter.

DESCRIPTION OF THE PREFERRED EMBODIMENTS

As shown in FIGS. 3 through 8, the invention provides secondary tensioners, positioned in proximity to the drive tower, to take up excessive chain slack during the operation of long chain systems. The term "secondary" refers to the fact that the existing drive tower 26 does provide primary chain tensioning, with the shortcomings described above. In this description, the term "idler" can refer to any non-driven elements over which the chain passes. Idlers can be formed in various shapes, including full-round shapes, which can be rotatable elements. Idlers can also refer to non-rotating shapes such as half-round shapes, and even full-round shapes provided so that if one side should wear down from use, another side could be moved into wear position, further extending the maintenance interval for this equipment. If not rotatable, the idlers would be formed of any suitable long-lasting low-friction material such as a polymer such as Teflon.

Figure 3:
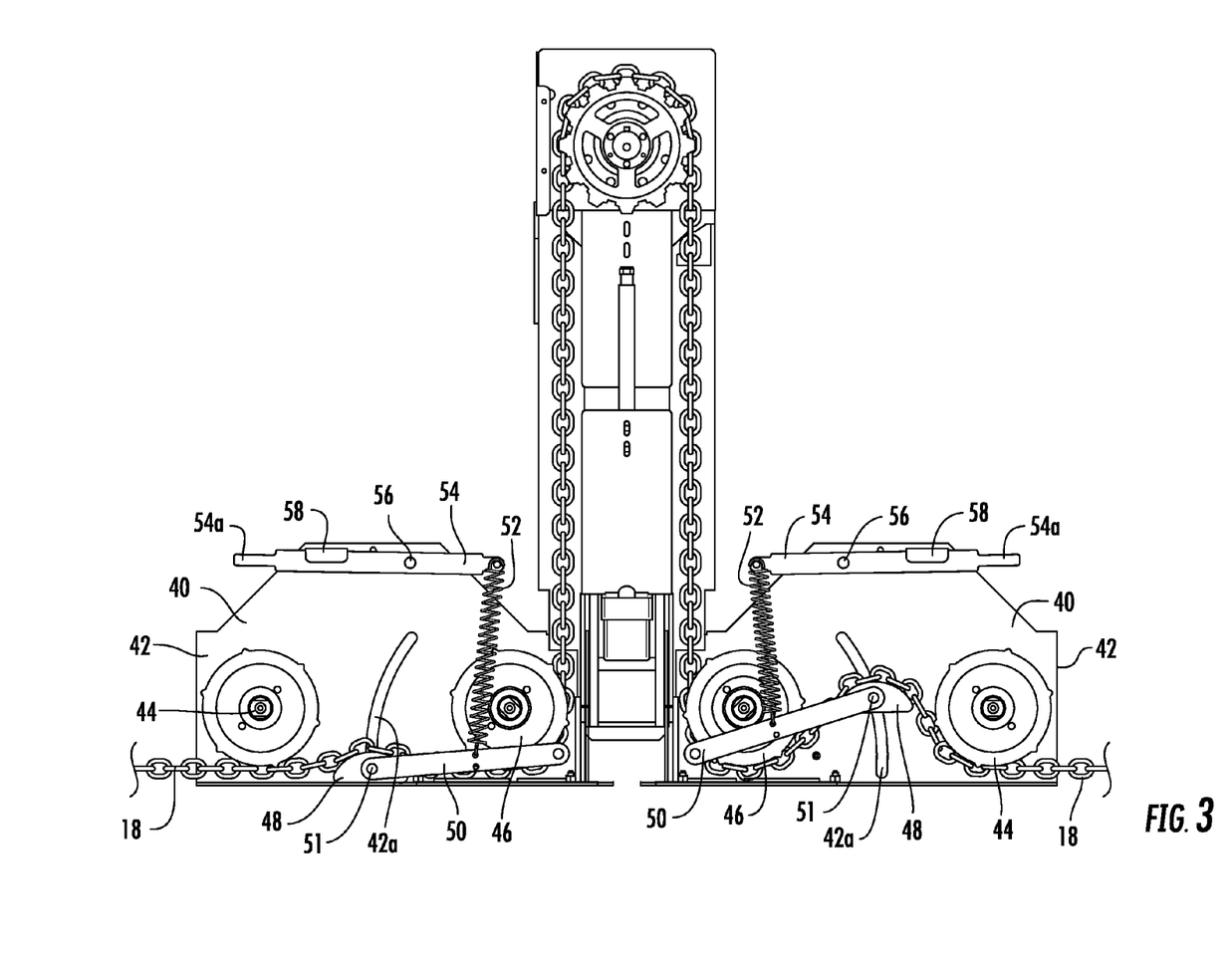
FIG. 3 is a front elevational view of a drive tower and secondary tensioners constructed according to one embodiment of the invention, with the front guards removed to show the sprockets and chain inside.

In the embodiment shown in FIG. 3, the secondary chain tensioner 40 includes a frame or plate 42 to which the parts of the secondary chain tensioner are to be mounted. The secondary chain tensioner 40 includes a pair of idlers, in this case a first idler wheel 44 and a second idler wheel 46, rotatably mounted to the frame 42. In this embodiment first idler wheel 44 may be the same as one of feed wheels 32a and 32b, although idler wheels 44, 46 could exist entirely outside of the drive tower, in a standalone mode. As shown in FIG. 3, the idler wheels 44, 46 are spaced apart, and a tensioner is positioned between them. The tensioner may be another idler wheel, but in the embodiment shown in FIG. 3, the tensioner is a tensioner idler block 48 formed of any suitable long-lasting low-friction material, such as a polymer such as Teflon. In the embodiment shown, tensioner idler block 48 is mounted to one end of a block lever 50. The opposite end of block lever 50 is pivotably connected to the frame 42 some distance away, such as, on the opposite side of one of the idler wheels 46. For stability, the range of movement of the tensioner idler block 48 is limited, by some suitable means such as a tensioner block pin 51 protruding from the tensioner idler block or the same end of the block lever 50, into a curved slot 42a formed in plate 42, to be slidable along the slot. While various arrangements are possible, in the embodiment shown, the radius of the curvature of the slot 42a is the same as the length of the block lever 50, that is, the distance between the pin 51 and the pivotable mounting of the block lever to the frame 42. The block lever 50 is biased upwards, or at least, in a direction (a "take-up" direction) so as to take the tensioner idler block 48 out of line with the idler wheels 44, 46, and thereby take up chain slack. The block lever 50 is biased by a biasing element, in this instance a spring 52. The spring 52 is connected to the block lever 50 somewhere along its length. In the embodiment shown in FIG. 3, the spring 52 is connected to the block lever 50 at about the center of the block lever. The opposite end of spring 52 is connected to a tensioning lever 54, preferably at one end thereof. Tensioning lever 54 is pivotably connected about at its center to frame 42 by means of a pin 56. In the embodiment shown in FIG. 3, the opposite end of tensioning lever 54 is formed into a handle portion 54a. A latch hook 58 is mounted on the frame 42 in a position so that the tensioning lever 54 can be engaged with the latch hook, and thus locked in a position so as to cause the spring 52 to bias the block lever 50 and the tensioner idler block 48 upward, that is, toward the take-up direction, so that the tensioner idler block is urged out of alignment with idler wheels 44, 46.

Figure 4:
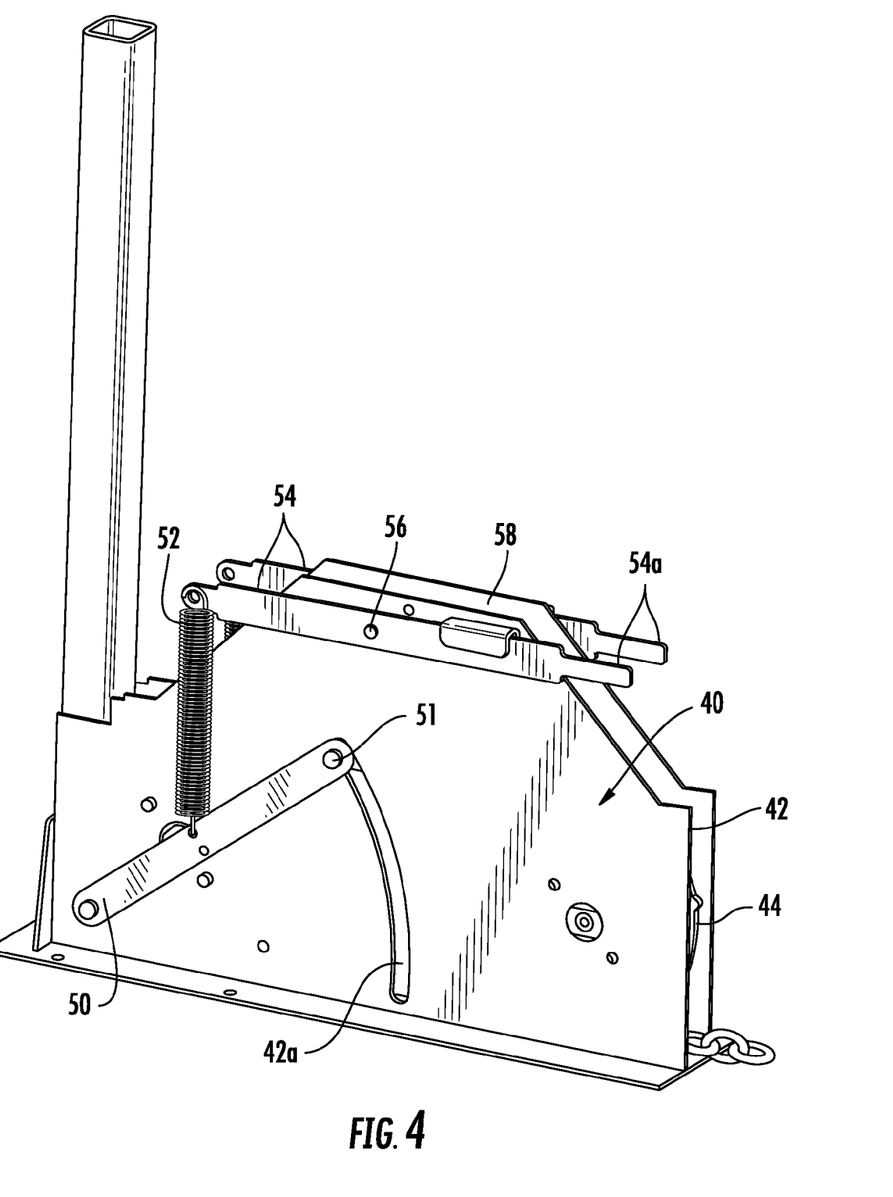
FIG. 4 is an isometric view of one side secondary tensioner according to one embodiment of the invention, with the guards in place, showing the placement of the levers and springs in locked position.

As shown in FIG. 4, in a related embodiment, the block lever 50, spring 52, tensioning lever 54 and latch hook 58 maybe doubled, surrounding the tensioner idler block (48, hidden in that figure but shown in FIG. 3), so as to provide symmetrical forces tending to bias the tensioner idler block upward, that is, toward the take-up direction.

Figure 5:
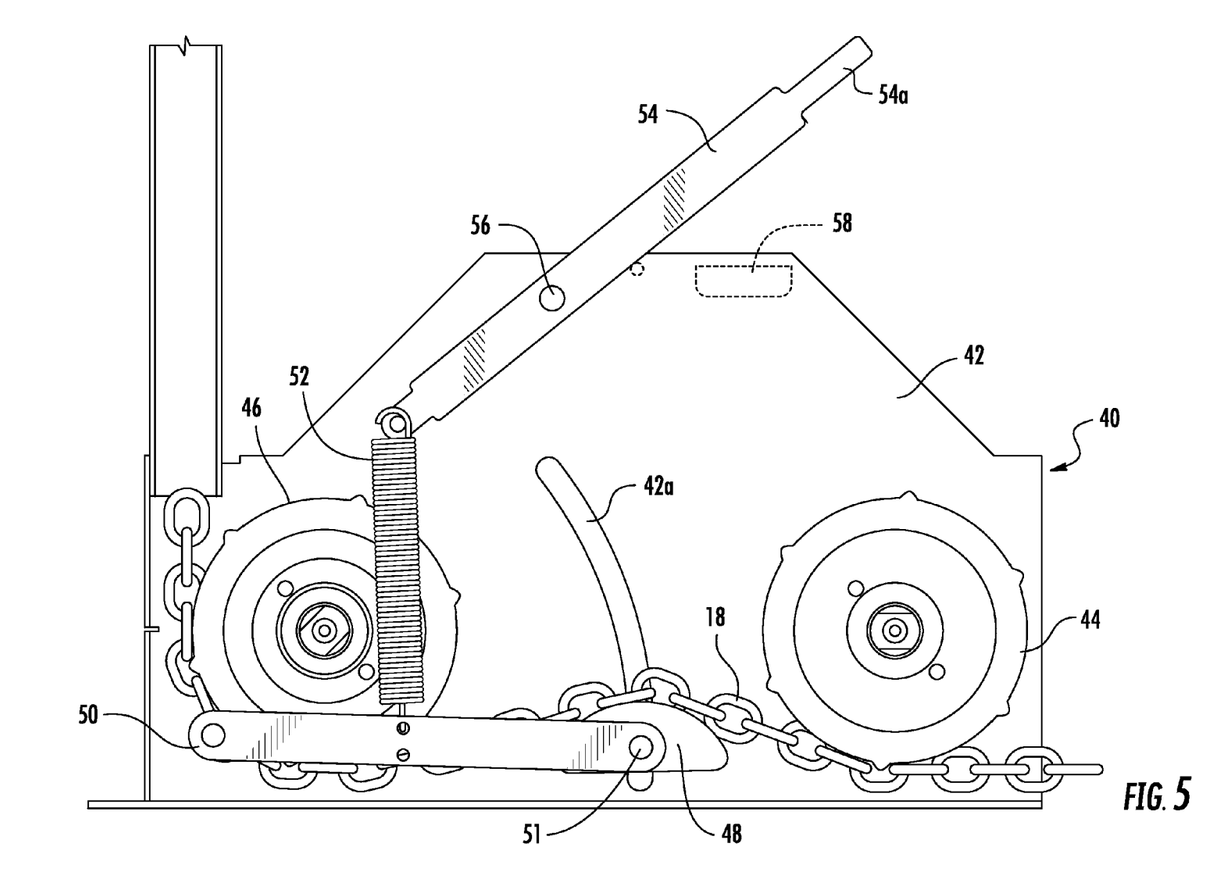
FIG. 5 is a front elevational view of a secondary tensioner apparatus according to one embodiment of the invention, showing the placement of the levers and springs in an unlocked position.

FIG. 5 shows the secondary chain tensioner 40 with the tensioning lever 54 disengaged from the latch hook 58, so that the tension on spring 52 is released, permitting the tensioner idler block 48 to move closer to alignment between idler wheels 44, 46. This would be a released position for the tensioning lever 54, as opposed to the engaged position shown for the tensioning lever 54 in FIGS. 3 and 4. By this means, the spring 52 may be replaced, or the length of the drag chain 18 may be adjusted, or other maintenance in general may be performed on the system, with the tensioning lever 54 in the released position.

Figure 6:
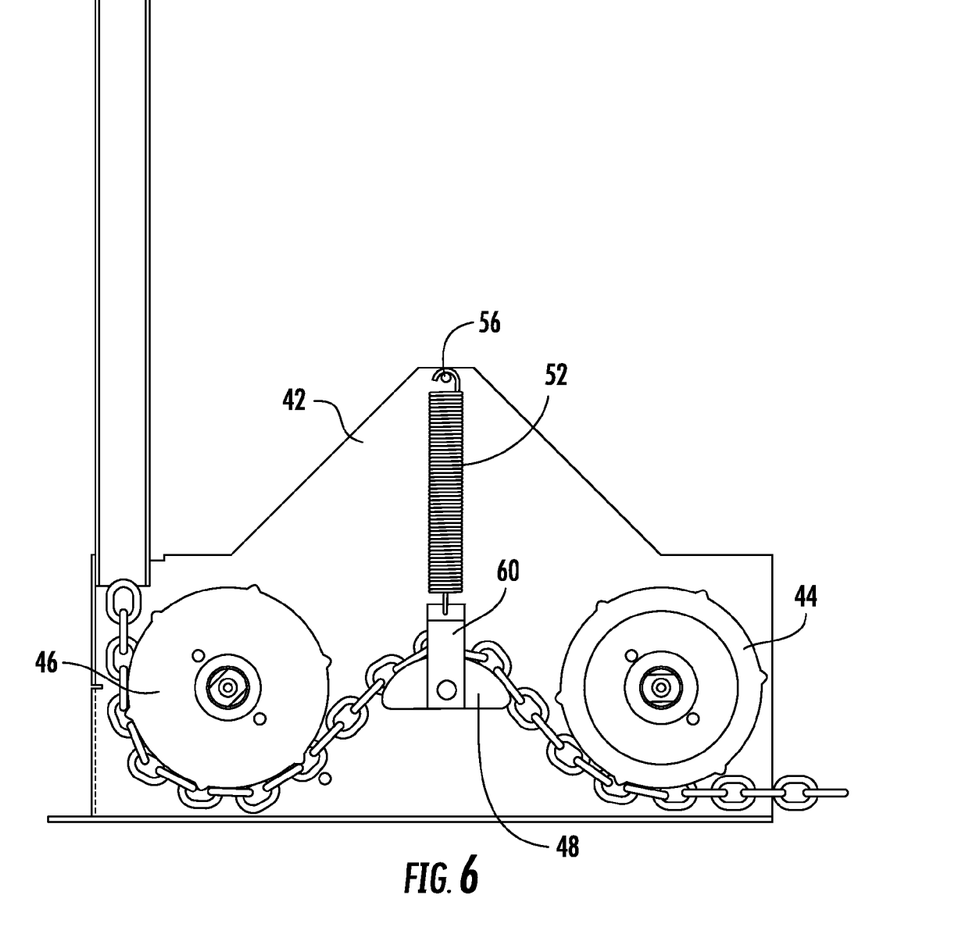
FIG. 6 is a front elevational view of a secondary tensioner apparatus according to an embodiment of the invention made without levers.

FIG. 6 shows an alternative embodiment where the spring 52 is connected to the tensioner idler block 48 merely by a clevis 60, and connected to the frame 42 merely by being hooked over a pin 56 attached to the frame. This arrangement would be simpler than the structure shown in FIGS. 3, 4, and 5, and possibly less expensive.

Figure 7:
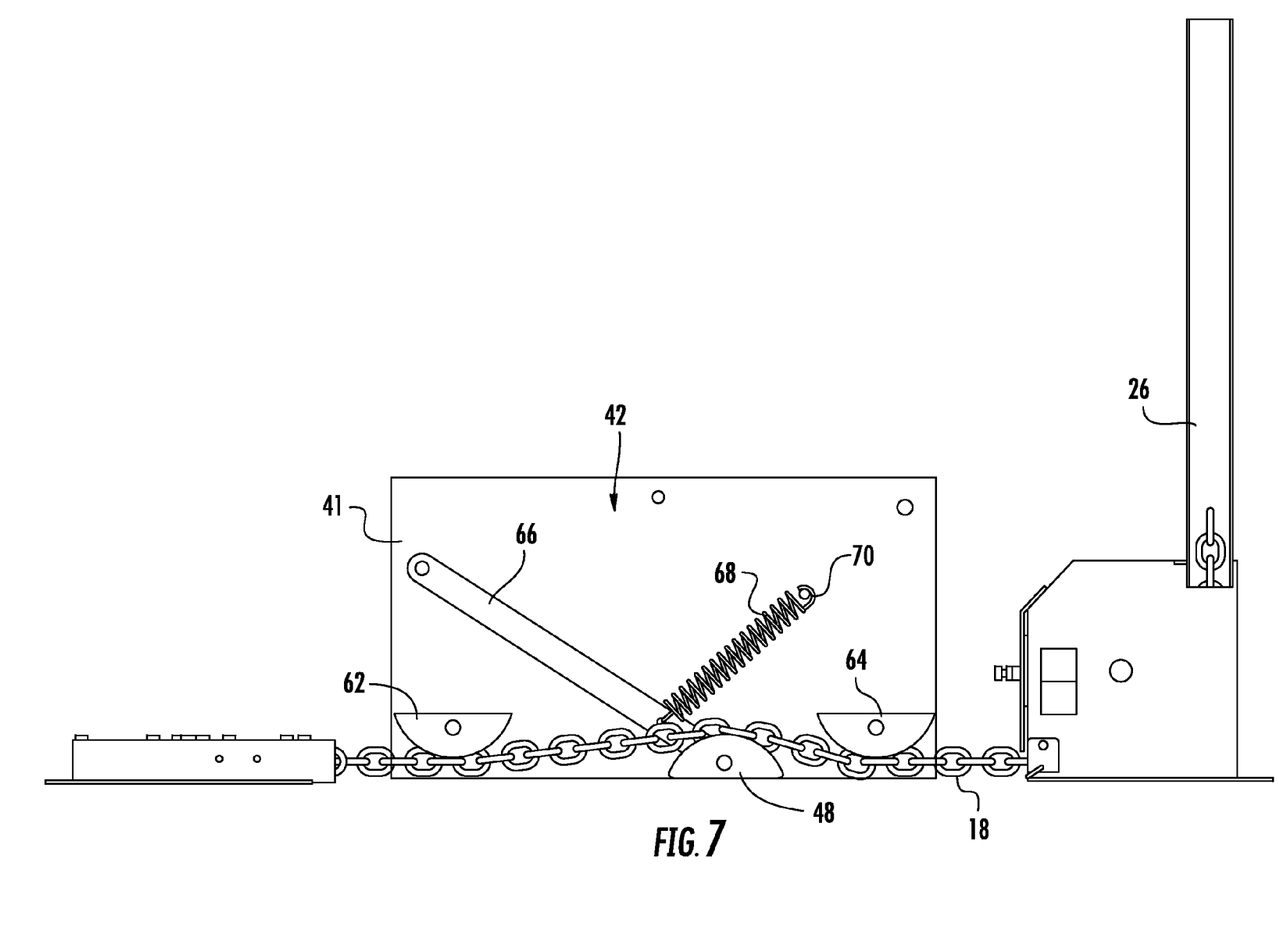
FIG. 7 is a front elevational view of a standalone secondary tensioner apparatus according to another embodiment of the invention.

FIG. 7 shows another alternative embodiment of the invention. Here, the secondary chain tensioner 41 may be entirely standalone from the drive tower 26, and simply be positioned close by so as to take up any slack that occurs in the chain 18, entirely outside of the drive tower. As shown there, the idler pulleys 44 and 46 of the other embodiments may be replaced by simple low friction idler blocks 62, 64. As is the case with the tensioner idler block 48, these low friction blocks can be made of any suitable long-lasting low-friction material such as a polymer such as Teflon. And again, while half-moon shapes are shown for these blocks, as well as tensioner idler block 48, all of these blocks could be formed in various shapes, including full-round shapes, so that if one side should wear down from use, another side could be rotated into position, further extending the maintenance interval for this equipment.

As shown in FIG. 7, the idler blocks 62, 64 are spaced apart and connected to frame 42 near the bottom, with a tensioner idler block 48 positioned between them. In this embodiment, tensioner idler block 48 is mounted to one end of a block lever 66. The opposite end of block lever 66 is pivotably connected to the frame 42 some distance away, such as, on the opposite side of one of the idler blocks 62, but above. The block lever 66 is biased upwards, or at least, in a direction so as to move the tensioner idler block 48 out of alignment with the idler blocks 62 (the take-up direction), by a biasing element, in this case spring 68. The spring 68 is connected at one end to the block lever 66 somewhere along the length of the block lever 66. In the embodiment shown in FIG. 7, the spring 68 is connected to the block lever 66 at a point on the block lever very near the tensioner idler block 48. The opposite end of spring 68 is connected to the frame 42, preferably by being hooked over a pin 70 attached to the frame, again in a position to bias the block lever 66 in the take-up direction, that is, so as to urge the tensioner idler block 48 out of alignment with the idler blocks 62.

The embodiment shown in FIG. 7 is shown oriented vertically, with the frame 42 in a generally upright position. This embodiment could also be employed in other orientations, such as a horizontal, or laid-down position, where the frame 42 is generally horizontal, and the take-up direction is generally horizontal, that is, that tensioner idler block 48 is urged by spring 68 to move in a generally horizontal direction.

In the embodiments shown in FIGS. 6 and 7, the unit will normally be in an engaged mode, that is, with the spring exerting force in the take-up direction, and the only way to achieve a released position is to unhook the spring 52, 68.

Figure 8:
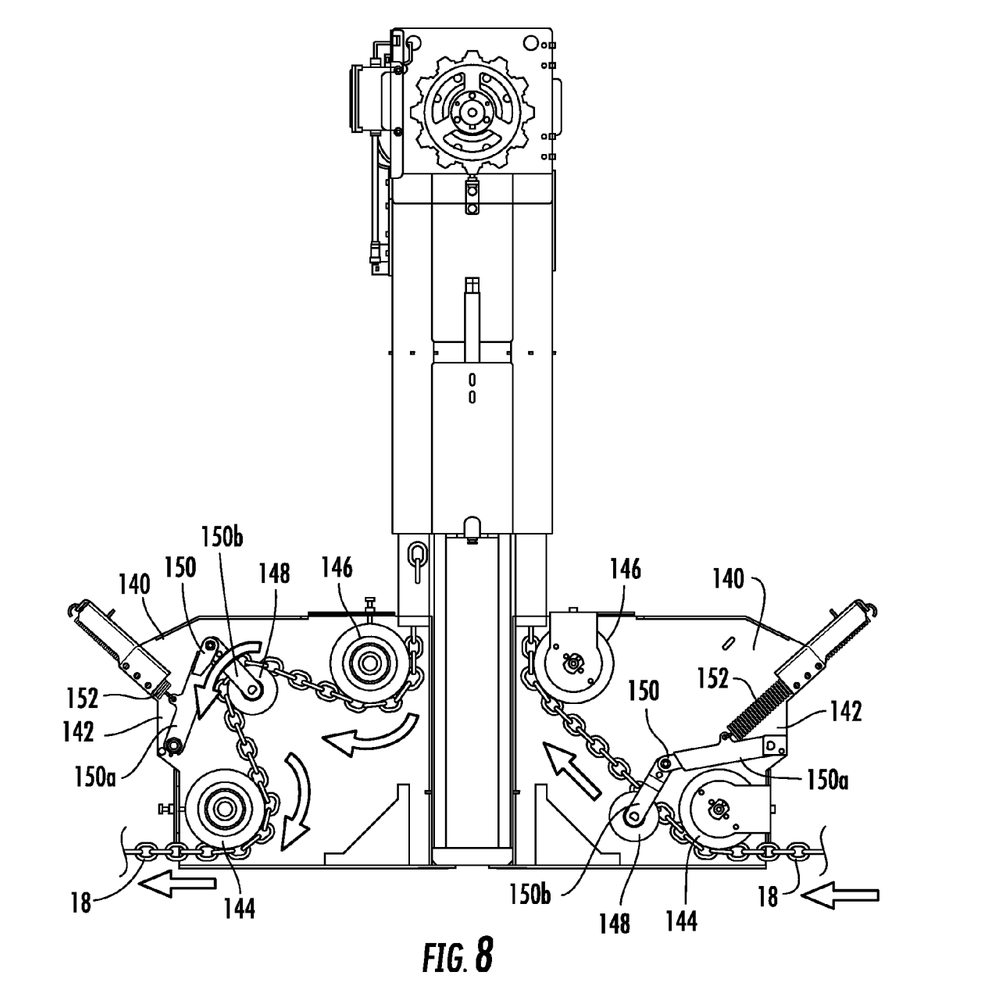
FIG. 8 is a front elevational view of a secondary tensioner apparatus according to yet another embodiment of the invention.

FIG. 8 shows another alternative embodiment of the invention. This embodiment includes secondary tensioners 140 (again, "secondary" to the primary tension provided within the drive tower) which take up any excessive chain slack during the operation of long chain systems. As there shown, each secondary chain tensioner 140 includes a frame or plate 142 to which the parts of the secondary chain tensioner are to be mounted. The secondary chain tensioner 140 shown in FIG. 8 includes a pair of idlers, in this case wheels 144, 146 rotatably mounted to the frame 142. The idler wheels 144, 146 are spaced apart, and a tensioner idler is positioned between them. As shown in FIG. 8, the tensioner idler may be a tensioner idler wheel 148, but the tensioner may also be a tensioner block formed of any suitable long-lasting low-friction material, such as a polymer such as Teflon. In the embodiment shown, tensioner idler wheel 148 is mounted to one end of a biasing member which in this instance is a multi-part block lever 150, formed of a lever arm 150a pivotably connected to a clevis arm 150b, which holds the tensioner idler wheel 148. The opposite end of lever arm 150a is pivotably connected to the frame 142. The tensioner idler wheel 148 is biased upwards, or at least, in a direction so as to be urged out of line with the idler wheels 144, 146 (the take-up direction), by a force provided by a spring 152, also a part of the multi-part block lever 150. The spring 152 is connected to the lever arm 150a somewhere within the length of the lever arm. In the embodiment shown in FIG. 8, the spring 152 is connected to the lever arm 150a at about the center of the lever arm. The opposite end of spring 152 is connected to the frame 142. As can be seen in looking at FIG. 8, the components of the left side secondary chain tensioner 140 are in position to take up slack in the chain 18, which would be described as a take-up position. On the right side of the figure, the chain is in tension, rather than slack, so that the spring 152 is extended, and secondary chain tensioner 140 on that side is not taking up any chain slack, and this would be termed a chain-taut position.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

I claim:

1. A chain tensioning apparatus for tensioning a chain of an agricultural barn cleaner, the barn cleaner including at least one gutter scraper connected to a chain, the chain being moved by a motor-driven drive sprocket mounted in a drive tower after contacting a first idler rotatably mounted to the drive tower, the chain tensioning apparatus comprising:
   a frame;
   a second idler mounted to the frame and positioned further away from the drive tower than the first idler such that, as the chain moves toward the drive tower, the chain contacts the second idler before contacting the first idler;
   a chain tensioning idler contacting the chain between the first idler and the second idler and capable of movement in a direction transverse to the movement of the chain; and
   a biasing member for biasing the chain tensioning idler toward a take-up position where the chain between the first and second idlers is relatively greater, and away from a chain-taut position where the length of chain between the first and second idlers is relatively less.

2. A chain tensioning apparatus as claimed in claim 1, further comprising means for releasing the biasing member.

3. A chain tensioning apparatus as recited in claim 1 wherein the biasing member includes a block lever pivotably mounted to the frame and to which the chain tensioning idler is attached, a spring connected to the block lever, and a tensioning lever pivotably connected to the frame, the spring connected to the tensioning lever, the tensioning lever having two positions, one corresponding to an engaged position and the other corresponding to a released position.

4. A chain tensioning apparatus as recited in claim 3 further comprising a hook connected to the frame, and wherein the tensioning lever is engaged with the hook when the tensioning lever is in the engaged position.

5. A chain tensioning apparatus as recited in claim 1 wherein the biasing member includes a spring connected between the frame and the chain tensioning idler.

6. A chain tensioning apparatus as recited in claim 5 further comprising a clevis connecting the spring to the chain tensioning idler.

7. A chain tensioning apparatus as recited in claim 1 wherein the chain tensioning idler is mounted to a block lever at one end of the block lever, the block lever having an opposite end pivotably mounted to the frame.

8. A chain tensioning apparatus as recited in claim 7 wherein the biasing member comprises a spring connected between the block lever and the frame, so as to urge the chain tensioning idler toward the take-up position and away from the chain-taut position.

9. A chain tensioning apparatus as recited in claim 1 wherein the biasing member comprises:
   a multi-part block lever, formed of a lever arm pivotably connected to a clevis arm, which clevis arm holds the tensioning idler, the opposite end of the lever arm being pivotably connected to the frame; and
   a spring, one end of which is connected to the lever arm, and another end of which is connected to the frame in a position so as to exert a force toward the take-up position and away from the chain-taut position.

10. An agricultural barn cleaner, comprising:
    at least one gutter scraper;
    a chain connected to the gutter scraper;

a drive tower including a motor-driven drive sprocket mounted in the drive tower and connected to the chain, and a first idler rotatably mounted to the drive tower, the motor-driven sprocket moving the chain toward the drive tower after contacting the first idler; and a chain tensioning apparatus having:
a frame;
a second idler mounted to the frame and positioned further away from the drive tower than the first idler such that, as the chain moves toward the drive tower, the chain contacts the second idler before contacting the first idler;
a chain tensioning idler contacting the chain between the first idler and the second idler and capable of movement in a direction transverse to the movement of the chain; and
a biasing member for biasing the chain tensioning idler toward a take-up position where the chain between the first and second idlers is relatively greater, and away from a chain-taut position where the length of chain between the first and second idlers is relatively less.

11. An agricultural barn cleaner as recited in claim 10 wherein the biasing member includes a block lever pivotably mounted to the frame and to which the chain tensioning idler is attached, a spring connected to the block lever, and a tensioning lever pivotably connected to the frame, the spring connected to the tensioning lever, the tensioning lever having two positions, one corresponding to an engaged position and the other corresponding to a released position.

12. A chain tensioning apparatus as recited in claim 11 further comprising a hook connected to the frame, and wherein the tensioning lever is engaged with the hook when the tensioning lever is in the engaged position.

13. An agricultural barn cleaner as recited in claim 10 wherein the biasing member includes a spring connected between the frame and the chain tensioning idler.

14. An agricultural barn cleaner as recited in claim 10 wherein the chain tensioning idler is mounted to a block lever at one end of the block lever, the block lever having an opposite end pivotably mounted to the frame.

15. An agricultural barn cleaner as recited in claim 14 wherein the biasing member comprises a spring connected between the block lever and the frame, so as to urge the chain tensioning idler toward the take-up position and away from the chain-taut position.

16. An agricultural barn cleaner as recited in claim 10 wherein the biasing member comprises:
a multi-part block lever, formed of a lever arm pivotably connected to a clevis arm, which clevis arm holds the tensioning idler, the opposite end of the lever arm being pivotably connected to the frame; and
a spring, one end of which is connected to the lever arm, and another end of which is connected to the frame in a position so as to exert a force toward the take-up position and away from the chain-taut position.

17. A chain tensioning apparatus for tensioning a chain of an agricultural barn cleaner, the barn cleaner including at least one gutter scraper connected to a chain, the chain being moved by a motor-driven drive sprocket mounted in a drive tower, the chain tensioning apparatus comprising:
a frame;
a first idler mounted to the frame;
a second idler mounted to the frame and positioned further away from the drive tower than the first idler such that, in a mode where the chain moves toward the drive tower, the chain contacts the second idler before contacting the first idler;
a chain tensioning idler contacting the chain between the first idler and the second idler and capable of movement in a direction transverse to the movement of the chain; and
a biasing member for biasing the chain tensioning idler toward a take-up position where the chain between the first and second idlers is relatively greater, and away from a chain-taut position where the length of chain between the first and second idlers is relatively less.

18. A chain tensioning apparatus as recited in claim 17 wherein the biasing member includes a spring connected between the frame and the chain tensioning idler.

19. A chain tensioning apparatus as recited in claim 17 wherein the chain tensioning idler is mounted to a block lever at one end of the block lever, the block lever having an opposite end pivotably mounted to the frame.

20. A chain tensioning apparatus as recited in claim 19 wherein the biasing member comprises a spring connected between the block lever and the frame, so as to urge the chain tensioning idler toward the take-up position and away from the chain-taut position.

* * * * *